United States Patent
Fertig et al.

(10) Patent No.: US 9,989,926 B2
(45) Date of Patent: Jun. 5, 2018

(54) SYSTEMS AND METHODS FOR POSITIONALLY STABLE MAGNETO-OPTICAL TRAPPING OVER TEMPERATURE

(71) Applicant: Honeywell International Inc., Morris Plains, NJ (US)

(72) Inventors: Chad Fertig, Bloomington, MN (US); Bernard Fritz, Eagan, MN (US); Karl D. Nelson, Plymouth, MN (US)

(73) Assignee: Honeywell International Inc., Morris Plains, NJ (US)

(*) Notice: Subject to any disclaimer, the term of this patent is extended or adjusted under 35 U.S.C. 154(b) by 0 days. days.

(21) Appl. No.: 15/286,452

(22) Filed: Oct. 5, 2016

(65) Prior Publication Data

US 2017/0242404 A1   Aug. 24, 2017

Related U.S. Application Data

(60) Provisional application No. 62/297,547, filed on Feb. 19, 2016.

(51) Int. Cl.
G04F 5/14       (2006.01)
G01B 9/02       (2006.01)

(52) U.S. Cl.
CPC .............. *G04F 5/14* (2013.01); *G01B 9/02* (2013.01)

(58) Field of Classification Search
USPC ........................................................ 250/251
See application file for complete search history.

(56) References Cited

U.S. PATENT DOCUMENTS 4,391,494 A * 7/1983 Hershel .............. G03F 7/70225
                                                355/43
5,657,160 A * 8/1997 Miyatake ............ G02B 27/283
                                                348/E5.141

(Continued)

FOREIGN PATENT DOCUMENTS

CN        200950173        9/2007
EP          2535779       12/2012

(Continued)

OTHER PUBLICATIONS

Rushton et al., "The Feasibility of a Fully Miniaturized Magneto-Optical Trap for Portable Ultracold Quantum Technology", May 14, 2014, pp. 1-23, Publisher: School of Physics & Astronomy, University of Southampton.

(Continued)

*Primary Examiner* — Phillip A Johnston
(74) *Attorney, Agent, or Firm* — Fogg & Powers LLC

(57) ABSTRACT

Systems and methods for positionally stable magneto-optical trapping over temperature are provided. In certain embodiments, an atomic sensor may include at least one laser source configured to produce at least one laser; one or more optical components, wherein the one or more optical components direct the at least one laser; and a vacuum cell, wherein the one or more optical components direct the at least one laser into the vacuum cell, wherein the one or more optical components and the vacuum cell are bonded together and components within the atomic sensor are fabricated from materials having similar coefficients of thermal expansion.

18 Claims, 4 Drawing Sheets

(56) References Cited

U.S. PATENT DOCUMENTS

| | | | | |
|---|---|---|---|---|
| 5,734,488 | A * | 3/1998 | Konno | G02B 26/123 |
| | | | | 347/242 |
| 6,900,702 | B2 * | 5/2005 | Youngner | G04F 5/14 |
| | | | | 331/94.1 |
| 7,126,112 | B2 * | 10/2006 | Anderson | G21K 1/006 |
| | | | | 250/251 |
| 7,944,317 | B2 * | 5/2011 | Strabley | G04F 5/14 |
| | | | | 250/251 |
| 8,121,158 | B2 * | 2/2012 | Aphek | G03B 21/16 |
| | | | | 372/34 |
| 8,712,198 | B2 * | 4/2014 | Bicknell | G02B 6/125 |
| | | | | 385/24 |
| 8,853,613 | B1 | 10/2014 | Compton et al. | |
| 9,083,363 | B2 * | 7/2015 | Fertig | G04F 5/14 |
| 2015/0022816 | A1 | 1/2015 | Schober et al. | |
| 2015/0200029 | A1 | 7/2015 | Hughes et al. | |

FOREIGN PATENT DOCUMENTS

| | | |
|---|---|---|
| EP | 2829925 | 1/2015 |
| JP | 2006337088 | 12/2006 |

OTHER PUBLICATIONS

European Patent Office, "Extended European Search Report from EP Application No. 17153159.3 dated Jul. 28, 2017", "from Foreign Counterpart of U.S. Appl. No. 15/286,452", dated Jul. 28, 2017, pp. 1-7, Published in: EP.

* cited by examiner

SYSTEMS AND METHODS FOR POSITIONALLY STABLE MAGNETO-OPTICAL TRAPPING OVER TEMPERATURE

CROSS REFERENCE TO A RELATED APPLICATIONS

This application claims the benefit of U.S. Provisional Patent Application Ser. No. 62/297,547, filed on Feb. 19, 2016, which is hereby incorporated herein by reference.

BACKGROUND

Atomic sensors based on laser cooled atoms may be of significant commercial importance. For example, they may be used for timing and navigation in GPS-denied environments. Traditional designs of these cold atom sensors direct the requisite laser beams from a laser source by using individual beam splitters and mirrors on kinematic-type or flexure-type adjustable mounts. Such mounting schemes may be prone to alignment creep during thermal cycling, and also can have large induced pointing drift over temperature ranges. In certain implementation, the fixed portion of adjustable mirror mounts may be held by a metal scaffolding surrounding an ultra-high vacuum (UHV) chamber containing the atoms. In this implementation, any mismatches of the coefficients of thermal expansion (CTE) between the various materials making up the scaffolding for the members can lead to pointing drift over temperature, as support arms contract or expand by differing amounts. If bulk retarding elements, such as wave plates, are used to prepare the polarization of the light field, changes in temperature can cause changes in the thickness of the waveplates, and in the angle at which the laser beams pass through the plates, leading to variation of laser beam polarization, which can lead the location of the trapped atoms in the magneto-optical trap (MOT) in the UHV chamber to shift. Further, in a miniature atomic sensor based on a vacuum chamber which is also a microwave resonator, changes in the position of the trap can lead to long term frequency instability by coupling to spatial phase inhomogeneities. Thus, conventional methods of manipulating the laser beams required for such a clock are not suitable for highly miniaturized clocks which are stable over relevant operating temperature swings.

SUMMARY

Systems and methods for positionally stable magneto-optical trapping over temperature are provided. In certain embodiments, an atomic sensor may include at least one laser source configured to produce at least one laser; one or more optical components, wherein the one or more optical components direct the at least one laser; and a vacuum cell, wherein the one or more optical components direct the at least one laser into the vacuum cell, wherein the one or more optical components and the vacuum cell are bonded together and components within the atomic sensor are fabricated from materials having similar coefficients of thermal expansion.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
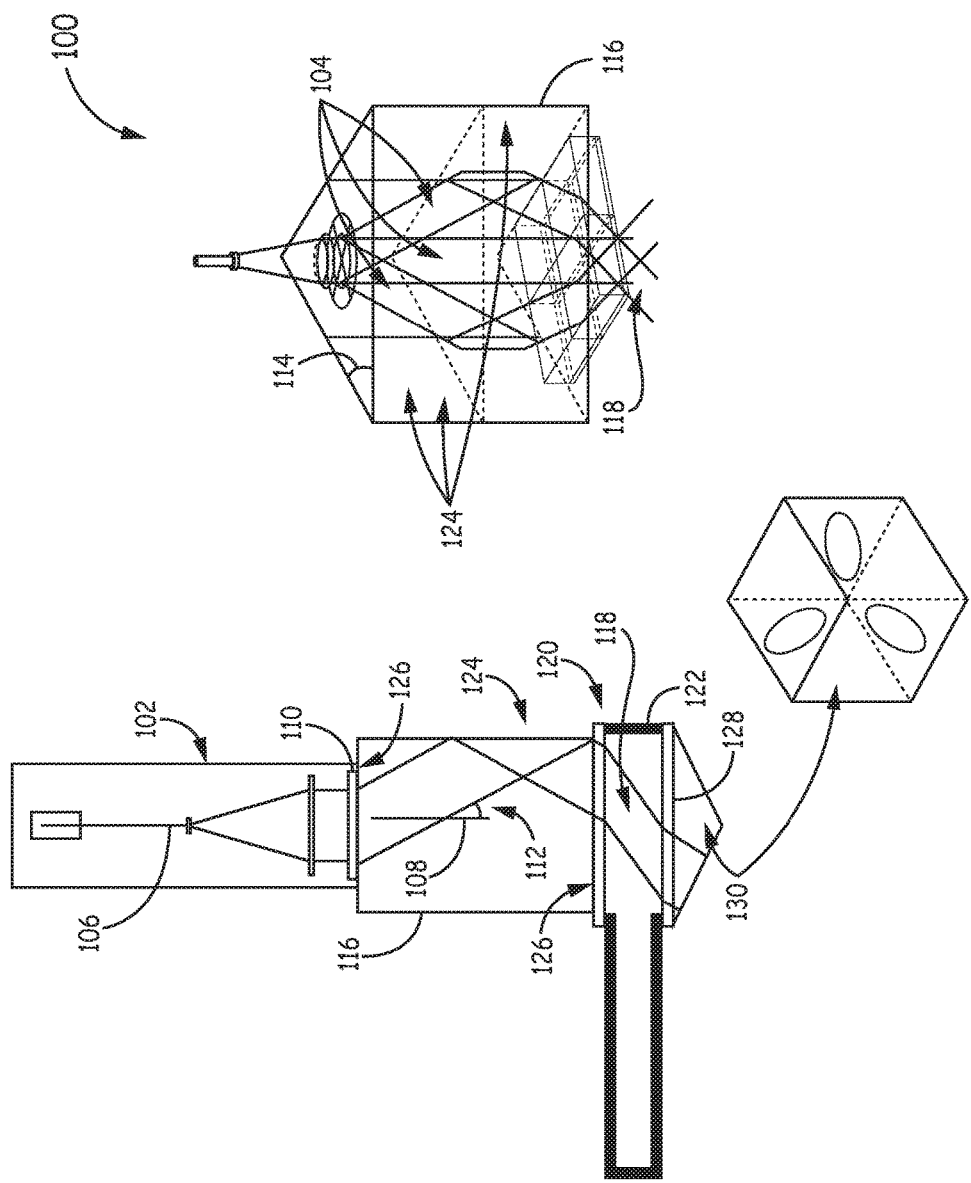
FIG. 1 is a diagram of a magneto-optical trap according to one implementation described herein.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments described herein are drawn to systems and methods for positionally-stable magneto-optical trapping over temperature changes. To make a magneto-optical trap that will be stable in position over temperature, an optical assembly and vacuum chamber are built as a single, monolithic, rigid, assembly. For example, the assembly may use solid prisms for beam steering that can be aligned during assembly and cemented into rigid contact with the vacuum cell and microwave resonator. The joined components in the assembly may be made from materials having matching CTEs. The critical angles in the assembly may be set by the shape of cut and polished glass prisms. The matched CTEs may ensure the long term stability of the polarization and alignment of the laser beams, even under large temperature excursions.

In at least one implementation, the assembly lacks in-vacuum optics. When used, in-vacuum optics may be non-adjustable once assembled without having to reseal the vacuum. Thus, in-vacuum optics may restrict the number or range of the degrees of freedom available for the adjustment and optimization of the beam path through the system after the vaccum is sealed. As the optics in the assembly are fabricated from solid prisms that are mounted into rigid contact with the vacuum cell and microwave resonator, there are no in-vacuum optics. Accordingly, the vacuum chamber may be constructed separately from the optical assembly, while the system maintains the number and ranges of the degrees of freedom necessary for the optimization of the beam path through the system.

In at least one implementation described herein, the polarization states of the three laser beams required for magneto-optical trapping may be set by the intrinsic retardation effect of light reflected by total internal reflection of a prism, where the retardation can be tuned by design of the thickness and material of a thin-film coating applied to the outside surface. Since these layers are only a few wavelengths thick, they are extremely insensitive to thermal-expansion-induced retardation error, in contrast to bulk waveplates.

As stated above, in certain implementations, the assembly is fabricated from materials with closely matched CTEs. In one particular example, the materials, SF11, sapphire, and 15/85 Copper-Tungsten Alloy have closely matched CTEs. In this way, thermal expansion causes a dilation of the geometry, which preserves the bounce angles of laser beams, and, more generally, preserves the intersection point of the lasers in the vacuum chamber, passively, by geometry—with no need for active steering or compensation. This is quite different from what happens if non CTE matched materials would be used, in which case the geometry is distorted and neither the laser bounce angles nor intersection point are preserved under substantially uniform thermal expansion of the sensor body.

FIG. 1 provides a cut away view of one implementation of an atomic sensor 100 constructed using CTE matched materials. For example, the atomic sensor may be used as a frequency standard or as an atomic interferometer. As illustrated in FIG. 1, a laser source 102 produces, a single laser beam 106 that is split into a triad of beams 104 that are directed into a prism 116, with the symmetry axis pointing along a prism symmetry axis 108. The splitting of the single laser beam 106 into a triad of beams 104 may be achieved by passing the single laser beam through a volume Bragg transmission grating 110. Further, the triad of laser beams may also be collimated. Alternatively, the laser source 102 may produce multiple laser beams that are directed into the prism 116. If the diffraction angle 112 is chosen correctly, and the apex angles 114 of the prism 116 are correct, then the triad of laser beams 104 may intersect at mutual right angles within a MOT region 118, if the prism 116 is cemented flat against a window 120 into the MOT 122. The above arrangement may simplify alignment as the only remaining degree of freedom for adjusting components is the lateral position of the center of the intersection 118 within the MOT 122. The position of the center of the intersection 118 can be moved by sliding the laser source 102 along the prism 116. The adjustment of the laser source 102 in relation to the prism 116 may be performed in real time while atoms are being trapped within the MOT 122 because none of the adjustable components are placed within a vacuum. When the laser source 102 is correctly positioned, optical index matching cement that may be placed between the laser source 102 and prism 116 may be cured. In certain implementations, the vacuum cell of the MOT 122 may be fabricated from metal bonded to the windows 120. As described above, the metal chosen may have a similar CTE to the material chosen for the fabrication of the windows 120.

In at least one implementation, the triad of laser beams 104 reflect from three reflection surfaces 124 of the prism 116 through TIR (total internal reflection). The reflection surfaces 124 of the prism 116 are differently coated with thin film coatings to produce a desired polarization rotation of each beam upon reflecting off of a respective reflection surface 124.

Figure 2:
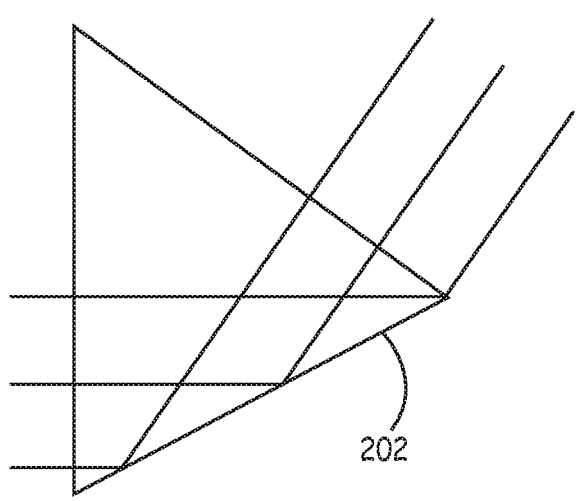
FIG. 2 is a diagram illustrating the effects of reflections on polarization according to one implementation described herein.

An example of producing the desired polarization rotation of a beam upon reflection of a surface is shown in FIG. 2. For example, in FIG. 2, a reflection surface 202 is illustrated. The desired polarization can be produced by varying the thickness and material composition of the thin film layer applied to the outside surface of a prism, such as prism 116 in FIG. 1. One having skill in the art may note that to fabricate a MOT, the polarization of one of three beams 104 has an opposite handedness when compared to the polarization of the other beams. Thus, different coatings may be applied to the different surfaces of prism 116 to acquire the desired polarization for the three beams 104. In at least one exemplary implementation, linearly polarized incident light is rotated to a correct elliptical polarization, though not yet circular, by coatings which are different on each side of the prism. In an alternative example, the light is made to be elliptical by the bounce off of surface the reflection surface 202 in FIG. 2. In another alternative example, a strongly birefringent material 126 may be placed where the prism 116 in FIG. 1 interfaces with other components.

In certain implementations, described in relation to FIG. 1, the reflected beams 104 pass through a planar vacuum window 120. The window 120 may be fabricated from glass or from a crystal (such as sapphire). In certain examples, an index matching cement may be used to bond the prism 116 to the window 120 used to reduce Fresnel reflections at the glass. In at least one exemplary implementation, the window 120 is coated only on the vacuum side of the window 120, that is the side of the window 120 facing the interior of the MOT 122. When the window 120 is fabricated from a birefringent material or birefringent material 126 is placed between the window 120 and the prism 116, such as sapphire, the polarization of the triad of beams 104 may change as the beams 104 pass through the window 120. The system may use the birefringence to further control the polarization of the triad of beams 104. For example, by using a c-cut window (optic axis normal to the surface), all the beams may be retarded similarly, due to the symmetry.

In certain implementations, to make a MOT such as MOT 122 in FIG. 1, the lasers must be retroreflected, with their polarization handedness reversed. FIG. 1 provides a reflector element without individual waveplates for each beam by engineering the rotation caused by an antireflective coating 128 on the second vacuum window to be exactly lambda/4. This is possible because all beams are circular polarized (by construction) and have the same angle of incidence on the surface (again, by construction), so that the coating may act as a lambda/4 retarder for all beams. Then an HR coating is applied to the external surface of the bottom prism 130 whose facets are normal to the beams.

Figure 3:
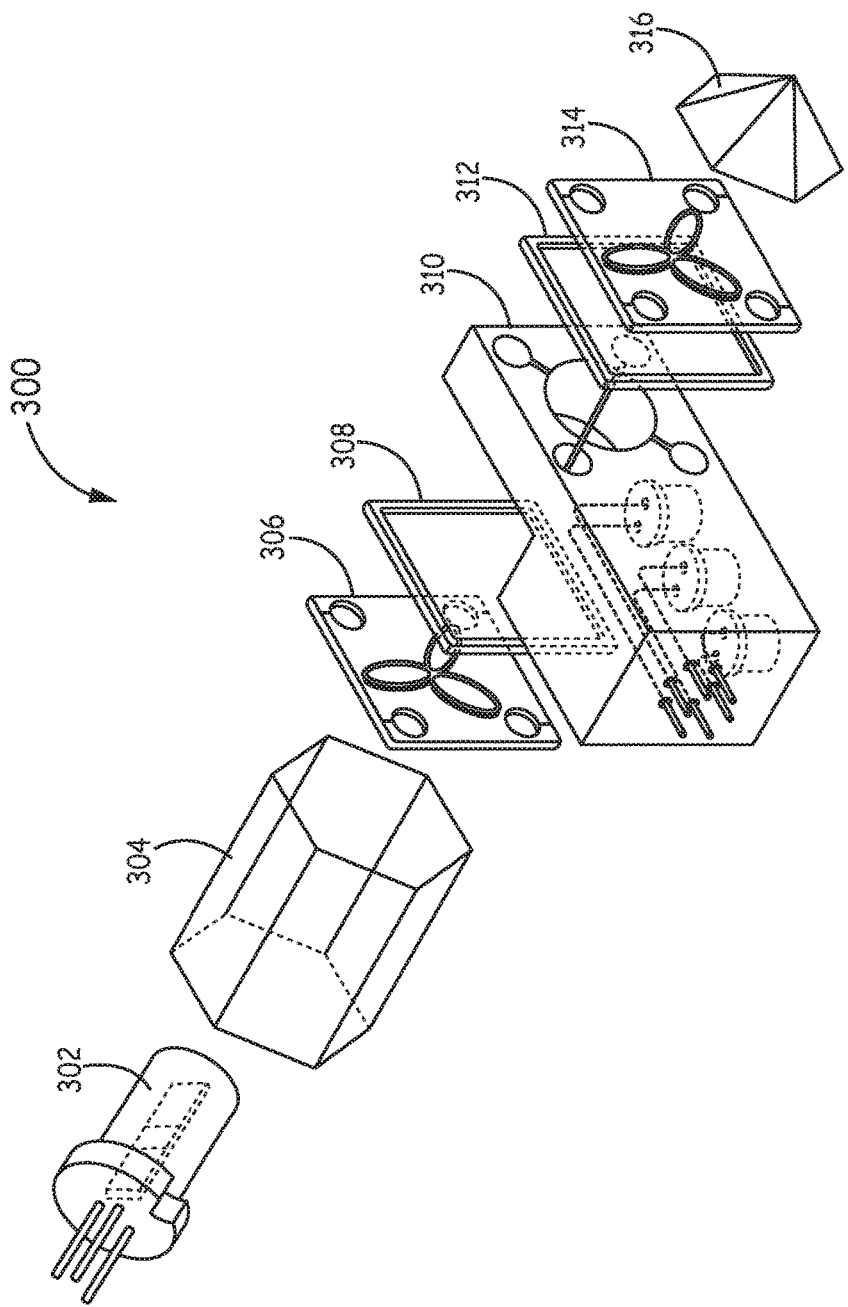
FIG. 3 is an exploded view of a magneto-optical trap according to one implementation described herein.

FIG. 3 provides an exploded view of the components of a system 300 used to fabricate a magneto-optical trap according to at least one embodiment described herein. As illustrated, the system 300 includes a laser source 302 that introduces a laser beam into a prism 304. As the laser beam is introduced into the prism 304, the laser beam may pass through one or more optical components that serve to split the beam into at least three separate laser beams traveling in different directions through the prism 304. As illustrated in FIG. 3, the prism 304 is a hexagonal prism, whereas the prism 116 in FIG. 1 was a triangular prism. Both prism 304, prism 116, and other prism shapes that are capable of directing the laser beams along the desired path may be used.

In certain implementations, when the laser beams have passed through the prism 304, they pass through a slab 306 that holds magneto-optical coils that are used to trap the atoms and then through a window 308 made from sapphire or some other birefringent material as described above. The prism is cemented to the slab 306 at a desired location using a cement having a matching CTE. When the laser beams pass through the window 308, the lasers may then enter the vacuum cell 310. The vacuum cell 310 includes components that may be used to introduce alkali atoms into the vacuum cell 310. Also, the components may also include pumps for preserving a vacuum. However, the components in the vacuum cell 310 are not part of the optical path and serve to support the intended functionality of the vacuum cell 310. In at least one implementation, the vacuum cell has an internal structure that may function as a loop-gap microwave resonator. Once, the laser beams pass through the vacuum cell 310, the laser beams then pass through another window 312 that is similar to window 308 as they may be both made of sapphire, or other birefringent material. Then the lasers pass through another slab 314 containing magneto-optical coils. After, the lasers pass through the slab 314, the lasers are retroreflected by a prism 316, which reflects the lasers back along their respective paths through the vacuum cell 310 and other components. As stated above, the components along the optical path are fabricated from materials that have similar CTEs. Further, the components illustrated in FIG. 3 are aligned and then bonded together using cement or other bonding methods such that the additional material used to perform the bonding also has a similar CTE to the components.

Figure 4:
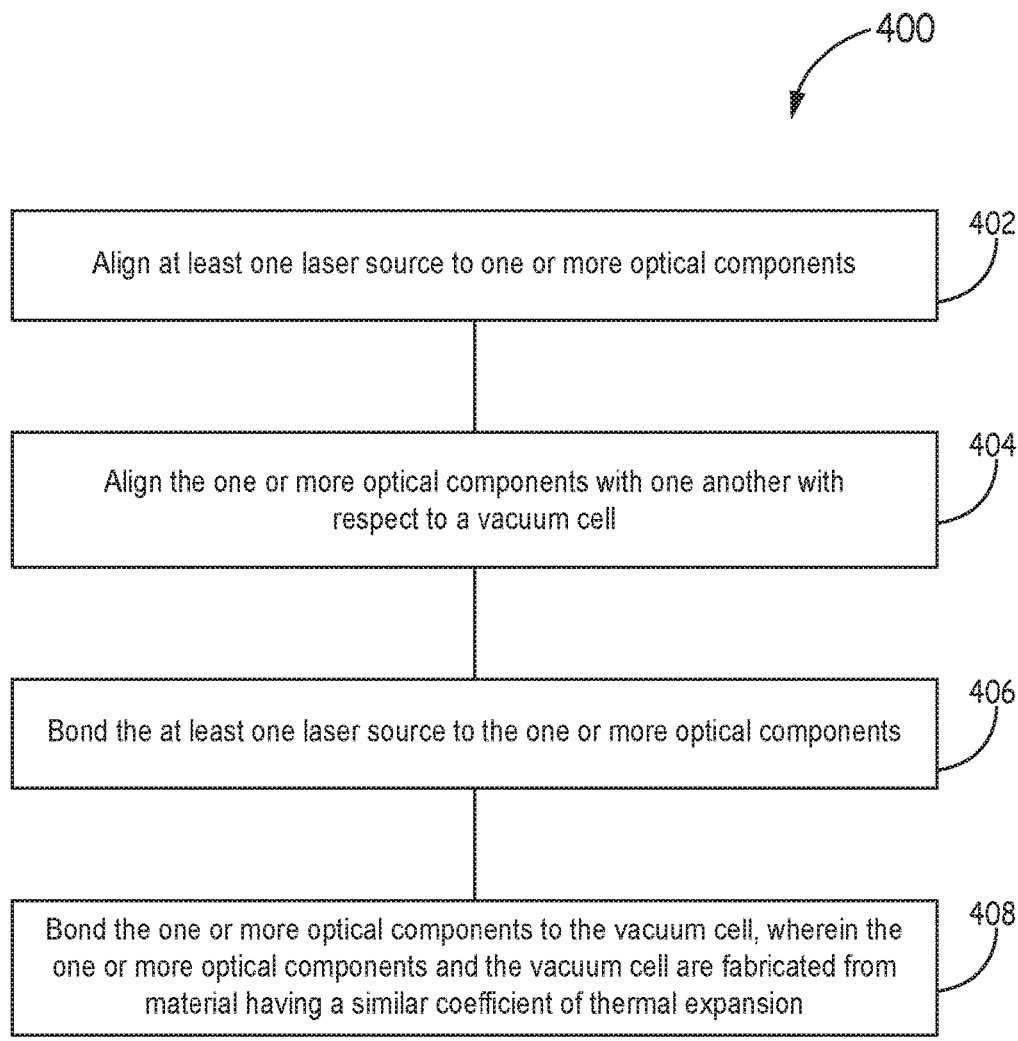
FIG. 4 is a flow diagram illustrating a method for fabricating a magneto-optical trap in accordance with embodiments described herein.

FIG. 4 is a flow diagram of a method 400 for fabricating an atomic sensor. Method 400 proceeds at 402, where at least one laser source is aligned to one or more optical components. Further, in at least one implementation, the one or more optical components may be configured to split a laser produced by the at least one laser source into a triad of laser beams and direct the triad of laser beams into a prism, where the prism is part of the one or more optical components. During fabrication of the optical components, the optical components are cut, polished and coated to provide the desired functionality, such as the desired bounce angles and polarizations. In another implementation the one or more optical components includes a Bragg transmission grating that is configured to split the laser into a triad of laser beams when the laser passes through the Bragg transmission grating. Method 400 proceeds at 404, where the one or more optical components are aligned with one another with respect to a vacuum cell. In certain implementations, a prism has layers deposited thereon, such that the thin layers affect the polarization of a laser beam that is reflected through total internal reflection at a surface of the prism.

In at least one other implementation, method 400 proceeds at 406, where the at least one laser source is bonded to the one or more optical components. In at least one implementation, method 400 proceeds at 408, where the one or more optical components are bonded to the vacuum cell, wherein the one or more optical components and the vacuum cell are fabricated from material having a similar coefficient of thermal expansion.

Management of pointing and retardation over temperature is a challenge. However, the polarization of this optical arrangement provides increased stability over temperature, as the thin film retarding coatings on the walls of the prisms and the vacuum windows are intrinsically very low order (very thin) making them extremely insensitive to temperature. The pointing also has increased stability as described herein, as materials in the stack-up have well-matched CTE's, so that under temperature excursions the geometry will undergo global scaling. Thus, the angles are substantially preserved, and the MOT will still be formed at the center of the vacuum chamber.

Example Embodiments

Example 1 includes an atomic sensor, the sensor comprising: at least one laser source configured to produce at least one laser; one or more optical components, wherein the one or more optical components direct the at least one laser; and a vacuum cell, wherein the one or more optical components direct the at least one laser into the vacuum cell, wherein the one or more optical components and the vacuum cell are bonded together and components within the atomic sensor are fabricated from materials having similar coefficients of thermal expansion.

Example 2 includes the atomic sensor of Example 1, wherein the one or more optical components and the vacuum cell are fabricated from different materials.

Example 3 includes the atomic sensor of Example 2, wherein the vacuum cell is partially fabricated from metal.

Example 4 includes the atomic sensor of Example 3, wherein the metal in the vacuum cell has an internal structure which functions as a loop-gap microwave resonator.

Example 5 includes the atomic sensor of any of Examples 1-4, wherein the one or more optical components split the at least one laser into a triad of laser beams and direct the triad of laser beams into a prism, wherein the prism is part of the one or more optical components.

Example 6 includes the atomic sensor of Example 5, wherein the similar coefficients of thermal expansion ensure that the triad of laser beams cross at the same relative location when the atomic sensor experiences changes in temperature.

Example 7 includes the atomic sensor of any of Examples 5-6, wherein the at least one laser is split into a triad of laser beams by passing through a Bragg transmission grating.

Example 8 includes the atomic sensor of any of Examples 5-7, wherein the prism has thin layers deposited thereon, wherein the thin layers affect the polarization of a laser beam that is reflected through total internal reflection at a surface of the prism.

Example 9 includes the atomic sensor of any of Examples 5-8, wherein the prism reflects the triad of laser beams through a window and planar magneto-optical coils into the vacuum cell, wherein the triad of laser beams orthogonally intersect one another at a location within the vacuum cell.

Example 10 includes the atomic sensor of Example 9, wherein the window is fabricated from a birefringent material.

Example 11 includes the atomic sensor of any of Examples 9-10, wherein after the triad of laser beams passes through the vacuum cell, a second window, and a second magneto-optical coil, a second prism retroreflects the triad of laser beams back along the path that was incident on surfaces of the second prism.

Example 12 includes the atomic sensor of any of Examples 1-11, wherein the one or more optical components and the vacuum cell are bonded together with cement, the cement having a similar coefficient of thermal expansion to the other components in the atomic sensor.

Example 13 includes the atomic sensor of any of Examples 1-12, wherein the atomic sensor functions as at least one of: an atomic frequency standard; and an atomic interferometer.

Example 14 includes the atomic sensor of any of Examples 1-13, wherein the vacuum cell is accompanied by at least one of: a source of alkali material; and a pump configured to maintain a vacuum within the vacuum cell.

Example 15 includes a method for fabricating an atomic sensor, the method comprising: aligning at least one laser source to one or more optical components; aligning the one or more optical components with one another with respect to a vacuum cell; bonding the at least one laser source to the one or more optical components; bonding the one or more optical components to the vacuum cell, wherein components of the atomic sensor are fabricated from materials having similar coefficients of thermal expansion.

Example 16 includes the method of Example 15, wherein the one or more optical components are configured to split at least one laser produced by the at least one laser source into a triad of laser beams and direct the triad of laser beams into a prism, wherein the prism is part of the one or more optical components.

Example 17 includes the method of any of Examples 15-16, wherein the one or more optical components includes a Bragg transmission grating that is configured to split the at least one laser into a triad of laser beams by passing through a Bragg transmission grating.

Example 18 includes the method of any of Examples 15-17, further comprising depositing thin layers on the prism, such that the thin layers affect the polarization of a laser beam that is reflected through total internal reflection at a surface of the prism.

Example 19 includes an atomic sensor, the sensor comprising: at least one laser source configured to produce at least one laser; one or more optical components, wherein the one or more optical components direct the at least one laser, the one or more optical components comprising: a prism, wherein the prism has thin layers deposited thereon, wherein the thin layers affect the polarization of a laser beam that is reflected through total internal reflection at a surface of the prism; and a vacuum cell, wherein the one or more optical components direct the at least one laser into the vacuum cell.

Example 20 includes the atomic sensor of any of Examples 16-19, wherein the one or more optical components and the vacuum cell are bonded together, wherein the one or more optical components and the vacuum cell are fabricated from materials having similar coefficients of thermal expansion.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

The invention claimed is:

1. An atomic sensor, the atomic sensor comprising:
at least one laser source configured to produce at least one laser beam;
one or more optical components, wherein the one or more optical components direct the at least one laser beam; and
a vacuum cell, wherein the one or more optical components direct the at least one laser beam into the vacuum cell, wherein the one or more optical components and the vacuum cell are bonded together;
wherein the one or more optical components and the vacuum cell are fabricated from different materials having similar coefficients of thermal expansion;
wherein the one or more optical components are configured to split the at least one laser beam into at least a triad of laser beams; and
wherein when the atomic sensor experiences changes in temperature, an intersection point of the at least a triad of laser beams within the vacuum cell is preserved as a result of the similar coefficients of thermal expansion.

2. The atomic sensor of claim 1, wherein the vacuum cell is partially fabricated from metal.

3. The atomic sensor of claim 2, wherein the metal in the vacuum cell has an internal structure which functions as a loop-gap microwave resonator.

4. The atomic sensor of claim 1, wherein the one or more optical components are configured to direct the at least a triad of laser beams into a prism, wherein the prism is part of the one or more optical components.

5. The atomic sensor of claim 4, wherein the at least one laser beam is split into the at least a triad of laser beams by passing through a Bragg transmission grating.

6. The atomic sensor of claim 4, wherein the prism has thin layers deposited on a surface thereof, wherein the thin layers affect polarization of a laser beam that is reflected through total internal reflection at the surface of the prism.

7. The atomic sensor of claim 4, wherein the prism reflects the at least a triad of laser beams through a window and planar magneto-optical coils into the vacuum cell, wherein the at least a triad of laser beams orthogonally intersect one another at a location within the vacuum cell.

8. The atomic sensor of claim 7, wherein the window is fabricated from a birefringent material.

9. The atomic sensor of claim 7, wherein after the at least a triad of laser beams passes through the vacuum cell, a second window, and a second magneto-optical coil, a second prism retroreflects the at least a triad of laser beams back along their paths of incidence.

10. The atomic sensor of claim 1, wherein the one or more optical components and the vacuum cell are bonded together with cement, the cement having a similar coefficient of thermal expansion to other components in the atomic sensor.

11. The atomic sensor of claim 1, wherein the atomic sensor functions as at least one of:
an atomic frequency standard; and
an atomic interferometer.

12. The atomic sensor of claim 1, wherein the vacuum cell is accompanied by at least one of:
a source of alkali material; and
a pump configured to maintain a vacuum within the vacuum cell.

13. A method for fabricating an atomic sensor, the method comprising:
aligning at least one laser source, configured to produce at least one laser beam, to one or more optical components;
aligning the one or more optical components with one another with respect to a vacuum cell;
bonding the at least one laser source to the one or more optical components;
bonding the one or more optical components to the vacuum cell, wherein the one or more optical components and the vacuum cell are fabricated from different materials having similar coefficients of thermal expansion, where the one or more optical components are configured to split the at least one laser beam into at least a triad of laser beams, and when the atomic sensor experiences changes in temperature, an intersection point of the at least a triad of laser beams within the vacuum cell is preserved as a result of the similar coefficients of thermal expansion.

14. The method of claim 13, wherein the one or more optical components are configured to direct the at least a triad of laser beams into a prism, wherein the prism is part of the one or more optical components.

15. The method of claim 13, wherein the one or more optical components includes a Bragg transmission grating that is configured to split the at least one laser beam into the at least a triad of laser beams by passing through a Bragg transmission grating.

16. The method of claim 13, further comprising depositing thin layers on a surface of the prism, such that the thin layers affect polarization of a laser beam that is reflected through total internal reflection at the surface of the prism.

17. An atomic sensor, the sensor comprising:
at least one laser source configured to produce at least one laser beam:
one or more optical components, wherein the one or more optical components are configured to direct the at least one laser beam, the one or more optical components comprising:
a prism, wherein the prism has thin layers deposited upon a surface thereof, wherein the thin layers provide a desired polarization of a laser beam that is reflected through total internal reflection at the surface of the prism; and a vacuum cell, wherein the one or more optical components direct the at least one laser into the vacuum cell.

18. The atomic sensor of claim 17, wherein the one or more optical components and the vacuum cell are bonded together, wherein the one or more optical components and the vacuum cell are fabricated from different materials having similar coefficients of thermal expansion.

\* \* \* \* \*